United States Patent
Nakajima et al.

(10) Patent No.: US 6,188,546 B1
(45) Date of Patent: *Feb. 13, 2001

(54) METHOD OF ELECTRICALLY CONNECTING A MAGNETIC HEAD, A MAGNETIC HEAD BODY AND A MAGNETIC DISC APPARATUS

(75) Inventors: Yasuyuki Nakajima; Keii Ueno, both of Yokohama; Michio Takahashi; Masayasu Fujisawa, both of Kanagawa-ken; Katsuya Fukasawa, Odawara; Issei Takemoto, Hiratsuka; Kooji Serizawa, Fujisawa; Kazushige Hashimoto, Yokohama; Shigeo Nakamura; Yukimori Umakoshi, both of Odawara; Mikio Tokuyama, Tsukuba, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/957,386

(22) Filed: Oct. 23, 1997

Related U.S. Application Data

(63) Continuation of application No. 08/566,595, filed on Dec. 4, 1995, now abandoned, which is a continuation of application No. 08/220,219, filed on Mar. 30, 1994, now abandoned.

(30) Foreign Application Priority Data

| Mar. 31, 1993 | (JP) | 5-073334 |
| Jul. 6, 1993 | (JP) | 5-166723 |
| Dec. 10, 1993 | (JP) | 5-310109 |

(51) Int. Cl.$^7$ ......................... G11B 5/60
(52) U.S. Cl. ......................... 360/234.5
(58) Field of Search ................. 360/103, 104, 360/234.5, 234.6

(56) References Cited

U.S. PATENT DOCUMENTS

| 3,564,522 | * | 2/1971 | Stevens, Jr. . | |
| 4,546,541 | * | 10/1985 | Reid | 29/603 |
| 4,761,699 | * | 8/1988 | Ainslie et al. | 360/103 |
| 4,789,914 | * | 12/1988 | Ainslie et al. | 360/103 |
| 4,996,623 | * | 2/1991 | Erpelding et al. | 360/104 |
| 5,006,946 | * | 4/1991 | Matsuzaki | 360/104 |
| 5,223,997 | * | 6/1993 | Uemura et al. | 360/103 |
| 5,296,983 | * | 3/1994 | Blanc et al. | 360/104 |
| 5,331,489 | * | 7/1994 | Johnson et al. | 360/104 |
| 5,343,344 | * | 8/1994 | Nagase | 360/104 |
| 5,396,390 | * | 3/1995 | Arakawa et al. | 360/123 |

FOREIGN PATENT DOCUMENTS

| 52-8813 | * | 1/1977 | (JP) | 360/103 |
| 56-111234 | * | 9/1981 | (JP) . | |
| 1-028931 | * | 1/1989 | (JP) . | |
| 4-219618 | * | 8/1992 | (JP) . | |

* cited by examiner

Primary Examiner—William Klimowicz
(74) Attorney, Agent, or Firm—Antonelli, Terry, Stout & Kraus, LLP

(57) ABSTRACT

The magnetic head assembly including a magnetic head having a terminal composed of a conductive film and a supporting spring. The supporting spring has interconnecting patterns (lines) on the top thereof and a projective electrode. The terminal of the magnetic head is electrically connected to the projective electrode of the supporting spring by a solderless, direct contact connection. The magnetic head is fixed to the supporting spring by using a non-electrical bonding agent. This structure makes it possible to stabilize the position of the magnetic head assembly and the relative speed variation between the magnetic head element and the magnetic disk, thereby enhancing the reliability of the magnetic disk apparatus.

15 Claims, 14 Drawing Sheets

METHOD OF ELECTRICALLY CONNECTING A MAGNETIC HEAD, A MAGNETIC HEAD BODY AND A MAGNETIC DISC APPARATUS

This application is a continuation of application Ser. No. 08/566,595, filed Dec. 4, 1995, now abandoned, which is a continuation of application Ser. No. 08/220,219 filed Mar. 30, 1994, now abandoned.

BACKGROUND OF THE INVENTION

The present invention relates to a magnetic disk apparatus, more specifically to a method of electrically connecting a magnetic head, a magnetic head assembly and a magnetic disk apparatus.

As an information age comes, a magnetic disk apparatus becomes essential to a computer or a word-processor. With increase of an amount of information, the magnetic disk apparatus has been requested to have more storage capacity, higher performance and a reduced size. The magnetic disk apparatus is normally composed of a magnetic disk part and a magnetic head part. As the magnetic disk apparatus keeps higher performance and a smaller size, the magnetic head part has been requested to be more accurate and smaller.

The conventional example of the magnetic head assembly used in the magnetic head part will be described with reference to FIGS. 16 and 17. FIG. 16 is a view showing an outer appearance of the conventional magnetic head assembly. FIG. 17 is an expanded view showing the part around the magnetic head contained in the magnetic head assembly.

A magnetic head 51 of the magnetic head assembly used in the magnetic disk apparatus is composed of a core slider made of ceramics, for example, and a magnetic head element. The magnetic head 51 is fixed on a tabular supporting spring 53.

A lead wire 55 is connected between the magnetic head element 59 provided in the magnetic head 51 and an electric circuit (not shown). The lead wire 55 is coated by an insulating material such as a resin in a manner to keep it insulated from the metallic supporting spring 53. The lead wire 55 is then passed through a protective tube 56, like a vinyl tube and the protective tube 56 is fixed at the supporting spring 53. The fixing of the protective tube 56 having the lead wire 55 therein is done by mechanical (caulking, for example) means. The lead wire 55 located between the magnetic head element 59 and the protective tube 56 is just coated by an insulating material such as a resin without being protected by the protective tube 56.

In the above structure, the portion of the lead wire 55 from the magnetic head element 59 to the protective tube 56 is formed to have a predetermined form for reducing the force given by the lead wire 55 against the magnetic head 51 (in other words, minimizing the adverse effect of the lead wire 55 on the magnetic head assembly when the magnetic disk is rotating at fast speed) in order to keep the posture of the magnetic head element 59 against the magnetic disk stable.

As the magnetic disk apparatus becomes smaller in-size and higher in performance, the magnetic head part has been requested to be smaller and more accurate. As such, it is important to keep the lead wire from the magnetic head element as vertically close to the supporting spring as possible, that is, to reduce the vertical mounting space of the lead wire as much as possible. Conventionally, the portion of the lead wire 55 from the magnetic head element 59 to the protective tube 56 fixed at the tip of the supporting spring 53 is formed to have a predetermined form. This forming of the lead wire 55, therefore, needs horizontal as well as vertical mounting space. This is an impedance to reducing the apparatus in size.

The elasticity of this lead wire 55 has an effect of applying excessive force to the magnetic head assembly when it is used. This results in disadvantageously changing the form of the spring and thereby keeping the position of the magnetic head assembly unstable when it is used.

In fixing the supporting spring 53 on the magnetic head 51, distortion is caused by hardening or shrinking the bonding agent. The distortion directly gives an adverse effect on the supporting spring 53 and the magnetic head 51. That is, the distortion causes as tension against the supporting spring 53 and the magnetic head 51 in a manner to keep them warped. The warpage is a factor in displacing the relative position between the magnetic head element 59 and the magnetic disk.

SUMMARY OF THE INVENTION

It is an object of the present invention to stabilize the position of the magnetic head assembly, fix the relative location between the magnetic head element and the magnetic disk, and enhance reliability of the magnetic disk apparatus.

In carrying out the object, a method of electrically connecting the magnetic head assembly composed of the magnetic head and the supporting spring is arranged to directly and electrically connect a terminal composed of a conductive film provided in the magnetic head to a projective electrode on the supporting spring having interconnecting lines (patterns) on the top side thereof.

In the magnetic head assembly arranged to electrically connect the magnetic head with the supporting spring having the interconnecting lines on the top side thereof, the magnetic head is fixed with the supporting spring with the bonding agent in the state that the terminal composed of a conductive film provided in the magnetic head is directly and electrically connected with the projective electrode formed in the supporting spring having the interconnecting lines on the top thereof.

In the magnetic head assembly arranged to electrically connect the magnetic head and the supporting spring having the interconnecting lines on the top thereof, the magnetic head is fixed with the supporting spring with a bonding agent in the state that the terminal provided in the magnetic head is directly and electrically connected with the end terminal formed by bending the free terminal containing the end of the interconnecting line, said end terminal provided with the supporting spring.

Further, the magnetic head assembly is characterized by fixing the magnetic head with the supporting spring having plural netted holes in all or part of the fixed part by using the bonding agent.

Moreover, a magnetic disk apparatus including at least a magnetic disk for magnetically recording or reading out data, a magnetic head assembly for inputting or outputting data as an electric signal through the effect of a magnetic head element, and a driving device for positioning the magnetic head assembly radially with the magnetic disk, uses the magnetic head assembly according to the present invention.

To describe the function of the present invention, in the method for electrically connecting the magnetic head assembly composed of the magnetic head and the supporting spring, the terminal composed of a conductive film, provided in the magnetic head, is directly and electrically connected with a projective electrode provided in the supporting spring having interconnecting lines on the top thereof, and the magnetic head is fixed on the supporting spring with the bonding agent in the state that the terminal composed of a conductive film, provided in the magnetic head, is directly and electrically connected with the projective electrode provided in the supporting spring having the interconnecting lines on the top thereof. This structure makes it possible to eliminate the lead wire formed in a predetermined form extending from the magnetic head to the tube fixed at the tip of the supporting spring, unlike the conventional magnetic head body. Hence, the vertical mounting space occupied by the lead wire may be removed, which makes a contribution to reducing the apparatus in size.

Further, the influences of the wind when the apparatus is in use and of the stiffness of the line on the magnetic head assembly are allowed to be kept constant. Hence, the form of the spring is not changed when the apparatus is in use and the posture of the magnetic head is kept stable, resulting in efficiently and stably reading or writing data.

Moreover, the magnetic head assembly is characterized to fix the magnetic head with the supporting spring having plural netted holes on part or all of the spring with the bonding agent. Hence, those holes serve as relief parts of the bonding agent. Further, the distortion caused by the tension due to shrinkage of the bonding agent when the bonding agent is hardened brings about no adverse effect on the magnetic head assembly. This makes it possible to inhibit the warpage of the supporting spring or the magnetic head when the magnetic head is fixed with the supporting spring.

The magnetic head assembly is allowed to be reduced in size. Hence, the positioning of the magnetic head assembly is made more quick when the magnetic disk apparatus is in use. This makes it possible to more efficiently record or read the data.

DESCRIPTION OF THE PREFERRED EMBODIMENTS

Figure 1A:
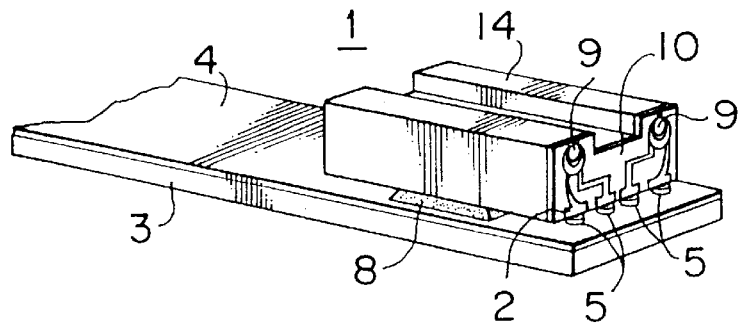
FIGS. 1A and 1B are views showing an outer appearance of an essential part of a magnetic head assembly according to an embodiment of the present invention.
Figure 1B:
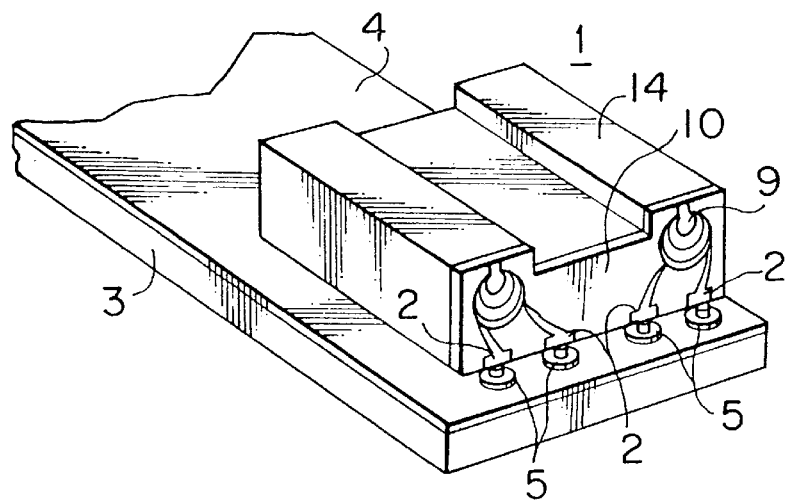

FIGS. 1A and 1B show a first embodiment of the present invention. In particular, FIG. 1A is a view showing an outer appearance of an essential part of the magnetic head assembly and FIG. 1B is an expanded view showing an essential part of the magnetic head assembly.

On the top of a metallic supporting spring 3, an insulating layer 4 is provided. The layer 4 contains interconnecting lines (not shown) inside of itself. The interconnecting lines mean interconnecting patterns formed on a substrate. Hereafter, they will be referred simply to as line or pattern. The line contained inside of the insulating layer 4 is connected to a tip of the supporting spring 3. Further, at the tip of the line, a projective electrode 5 made of gold (Au), for example, is provided in a manner to penetrate the insulating layer 4.

On the other hand, a magnetic head 1 is composed of a core slider 14 made of ceramics, for example, and a magnetic head element 9. On the side 10 (tip side of the supporting spring 3) is provided a magnetic head element 9 and a terminal 2 of a line connected to the magnetic head element 9. The terminal 2 is electrically connected with the projective electrode 5. Further, the magnetic head 1 is fixed with the insulating layer 4 located on the top of the supporting spring 3 by using a bonding agent 8 (which will be referred to as "fixing of the magnetic head with the supporting spring") so that no structural force is applied onto the electric connected portion. The above-mentioned structure makes it possible to eliminate the adverse effect on the magnetic head 1 as well as the magnetic head assembly conventionally given by the lead wire 15 and to stabilize the relative position between the magnetic head 9 and the magnetic disk.

[Embodiment 2]

Figure 2:
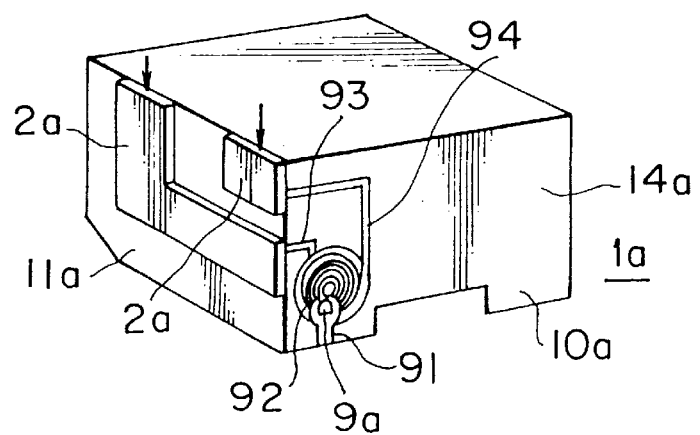
FIG. 2 is a view showing an outer appearance of a magnetic head according to an embodiment of the present invention.
Figure 3A:
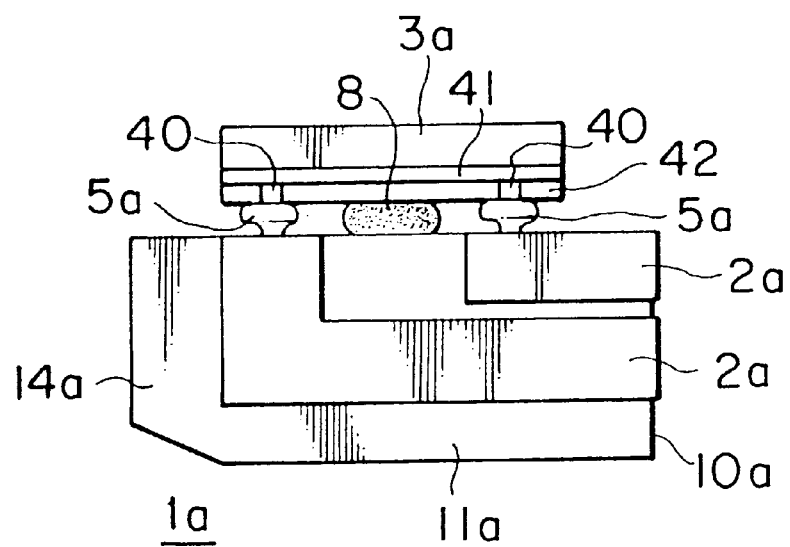
FIG. 3A is a plan view showing the magnetic head according to the embodiment of the invention provided with a supporting spring.
Figure 3B:
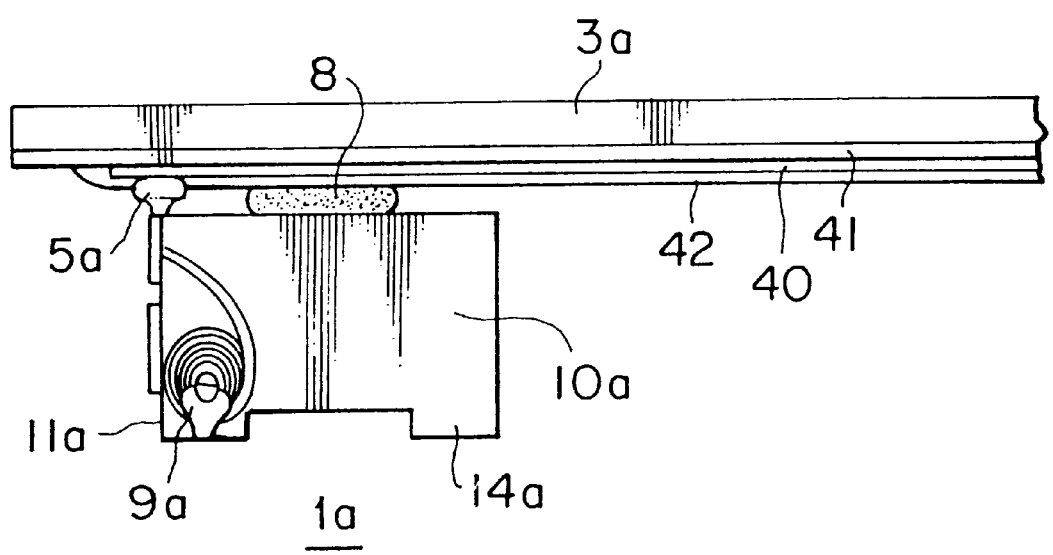
FIG. 3B is a side view showing the magnetic head according to the embodiment of the invention provided with the supporting spring.

FIGS. 2, 3A and 3B show a second embodiment of the present invention. FIG. 2 is a view showing an outer appearance of a magnetic head to which the present invention applies. FIG. 3A is an elevation showing the second embodiment containing the supporting spring. FIG. 3B is a side view showing the second embodiment containing the supporting spring.

As shown in FIG. 2, the magnetic head 1a is formed by forming a filming circuit on a side 10a of the core slider 14a made of ceramics, for example, mounting a thin-film magnetic head element 9a on the side 10a, and forming a terminal 2a made of a conductive film on the thin-film circuit and a side 11a of the core slider 14a except for the floating surface. (The arrow shown in the terminal 2a indicates an electric connecting location and a connecting state of the supporting spring with the projective electrode.)

As shown in FIGS. 3A and 3B, the magnetic head 1a of this embodiment may locate the side 10a having the thin-film magnetic head element 9a thereon substantially with the longitudinal axis of the supporting spring 3a (differently from the magnetic head element 9 of the first embodiment as shown in FIGS. 1A and 1B). In this case, the terminal 2a formed of a conductive film on the side 11a of the magnetic head 1a just needs to be divided into two or more parts corresponding to the number of lines led from at least the thin-film magnetic head element 9a. The side 11a does not need to locate the thin-film magnetic head element 9a. Each divided part of the terminal 2a is connected to a projective electrode 5a. Hence, the terminal 2a is not limited by the thin-film magnetic head element 9a and may keep a large area. This makes it easy to position and connect the projective electrode 5a at the stage of the post-manufacture.

Further, in the connection between the terminal 2a formed on the side 11a of the magnetic head 1a and the projective electrode 5a formed on the line 40 on the insulating material on the supporting spring 3a, to bring about the same effect, the end of the terminal 2a may be electrically connected with the projective electrode 5a, and the magnetic head 1a may be fixed with the supporting spring 3a (through the insulating material 41 or the insulating material 42 provided on the line 40).

Then, the method of forming the magnetic head and the line on the top of the supporting spring, which are commonly used in the foregoing two embodiments, and the method of connecting them with each other will be described with reference to FIGS. 2, 4 and 5.

Figure 4:
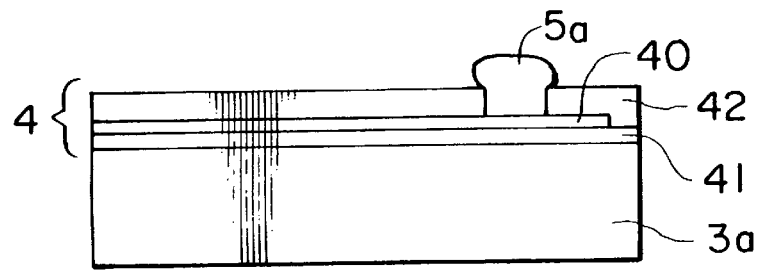
FIG. 4 is a end view showing an interconnecting line located on the top of the supporting spring.

As shown in FIG. 4, an insulating resin 41 such as polyimide is coated on the surface of the metallic supporting spring 3a, and then the line 40 is printed on the resin-coated top of the spring 3a. At the tip of the line 40, the projective electrode 5a having a height of about 5 to 20 μm is formed by means of a so-called wire-bumping method. Then, the line 40 except for the projective electrode 5a is coated by the insulating resin 42 such as polyimide.

On the other hand, the core slider 14a of the magnetic head 1a is an insulating body made of ceramics, for example. As shown in FIG. 2, the core slider 14a includes at least one thin-film magnetic head element 9a for magnetically recording or reading out data on the plane 10a adjacent to the side of the recording medium (magnetic disk). In this embodiment, the thin-film magnetic head element 9a is produced by a thin-film process such as a photo-etching technique. Likewise, this thin-film process is very suitable to the line 40 formed on the top of the supporting spring 3a. The detail of the thin-film process will be discussed below.

The thin-film technique as described herein is a method of patterning a thin film deposited by evaporation or sputtering with a photo-etching technique. As taking an example, the line 40 may be formed on the top of the supporting spring 3.

At first, the insulating layer 41 is formed on the top of the metallic supporting spring 3a. The insulating layer 41 may be formed by laminating the films. The film is fixed with the supporting spring 3 by using a bonding layer (not shown). The material of the film is suitable to the material such as polyester, polyamide, polysulfone, and polyimide from a viewpoint of thermal stability or material strength. In addition, the material of the bonding layer is suitable to the material such as an epoxy resin having both the bonding characteristic and the material strength.

Next, the conductive film is deposited on the insulating layer 41 by means of the sputtering technique. For forming the conductive film, metal such as copper (Cu) or aluminium (Al) having small electric resistance is normally used.

Last, the conductive film is patterned by means of the photo-etching technique. The photo-etching is performed by forming a photo-resist on the conductive film, exposing and developing the film for forming an inorganic film pattern, etching the conductive film with the pattern as a mask, and transcribing the patterns. The etching may be either a dry etching or a wet etching. To enable mass production of the products, the wet etching is more advantageous. If the process needs to be more accurate, the dry etching is better. With this technique, the line 40 may be formed.

As described above, the method executed by the thin-film technique has been described. In place, the printing technique or the plating technique may be used for forming a line on the supporting spring. In addition, a flexible substrate may be used as well. Of these techniques, the thin-film technique is more advantageous in stabilizing the spring characteristic of or reducing the weight of the supporting spring, because the technique makes the line thinner.

It goes without saying that the foregoing process may apply to forming of the thin-film magnetic head element 9a, a primary coil 91, a secondary coil 92, lines 93, 94 and a terminal 2a formed on the magnetic head 1a.

Further, conductive super fine grains may be used for producing the line 40 on the supporting spring 3a. The use of the fine grains makes it possible to bend the spring without having damage to the spring 3a and the line 40. It means that no adverse effect is given to the spring characteristic and the line reliability of the resulting supporting spring 3a, the detail of which will be discussed below.

The supporting spring 3a is normally bent so that the spring 3a may push the magnetic head 1a against the surface of the magnetic disk. In particular, the metallic supporting spring needs a heat treatment. This is for eliminating the distortion of the bent spring for keeping the quality of the spring for a long time. This heat treatment is, in general, executed in so high a temperature that a normal organic material may not be endurable, though the concrete temperature is variable depending on the material of the spring. Hence, it is better to take the wiring step after having heat treatment of the bent spring 3a, for the purpose of keeping the wired line insulated from the metallic spring and avoiding disconnection of the line.

On the other hand, the thin-film magnetic head element 9a used for magnetically recording or reading data is composed of a primary coil 91 and a secondary coil 92 as shown in FIG. 2. The primary coil 91 serves to change the data recorded on a recording medium into an electric signal. The secondary coil 92 serves to amplify the electric signal. The secondary coil 92 provides two terminals served as lines 93 and 94 for connection. These two lines 93 and 94 are formed in a manner to be in contact with the two terminals 2a provided on one side 11a adjacent to the side where the thin-film magnetic head element 9a is formed.

Figure 5:
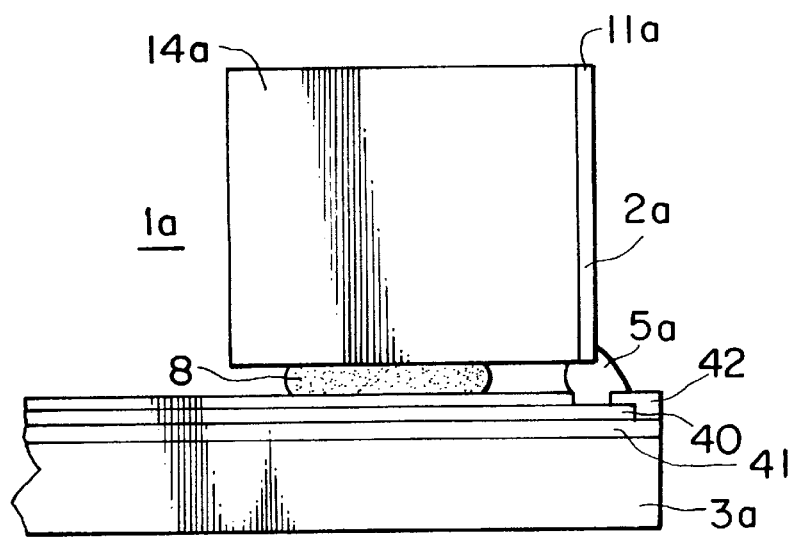
FIG. 5 is a end view showing connection between the magnetic head and the supporting spring.

As shown in FIG. 5, the proper amount of bonding agent 8 is applied on the opposite side to the recording medium of the magnetic head 1a for fixing it with the supporting spring 3a. Then, the end of the terminal 2a of the magnetic head 1a is fitted to the tip of the projective electrode 5a with a positioning tool (not shown). This fitting makes it possible to electrically connect the terminal 2a of the magnetic head 1a to the projective electrode 5a. The magnetic head 1a is fixed on the insulating layer 42 on the top of the supporting spring 3a with the bonding agent 8 so as to inhibit the application of structural force on an electric connected part.

The aforementioned description has stated that the projective electrode 5a is made of gold. In practice, the material of the electrode 5a is not limited to gold. In place of gold or gold system metal, it is possible to use an alloy of lead and stannum (Pb—Sn), stannum (Sn), indium (In), bismuth (Bi), cadmium (Cd) or an alloy of some or all of these materials. If one of these materials is used, as shown in FIG. 5, the conventional soldering operation may be used for making an electric connection by using a low melt point of these metals.

That is, this is so-called welding or brazing, in which the low-melting point metal is melted by a local heater such as a laser or an electron beam for making an electric connection. In particular, a low-melting point material containing Indium and Bismuth makes it possible to make a connection without having any thermal adverse effect on the other parts.

Further, if the gold system metallic film is used for forming the terminal 2a, the electric connection between the terminal 2a and the projective terminal 5a is made easier since the gold system metal is very expandable, which provides more excellent connecting structure. Compared with the other metal, the connection can be achieved at the lowest temperature. This gives no thermal adverse effect to the other parts.

To more easily make the electric connections, it is possible to take the steps of forming the insulating layer 41 on the top of the supporting spring 3a, the line 40 on the insulating layer 41, cover the part except the projective electrode 5a with another insulating layer 42, and form the projective electrode 5a to have a height of 5 to 20 μm with reference to the top of the insulating layer 42.

If the height of the projective electrode 5a is higher than 0 with reference to the top of the insulating layer 42, the electric connection is made more easily. To stably implement the mass production of the excellent products, however, the positioning is made more difficult in working or assembly if the height is 5 μm or less. On the contrary, if the projective electrode 5a is apart from the terminal by a length of 20 μm or more, unpredictable secondary transformation such as buckling may appear when the electric connection is made. It often becomes an obstacle to stabilizing the quality. ("Buckling" is detailed in some publications such as a book on plasticity. Hence, it is not described herein.) If gold is used for making the projective electrode 5a, the most excellent effect can be achieved for making the electric connection.

Figure 6:
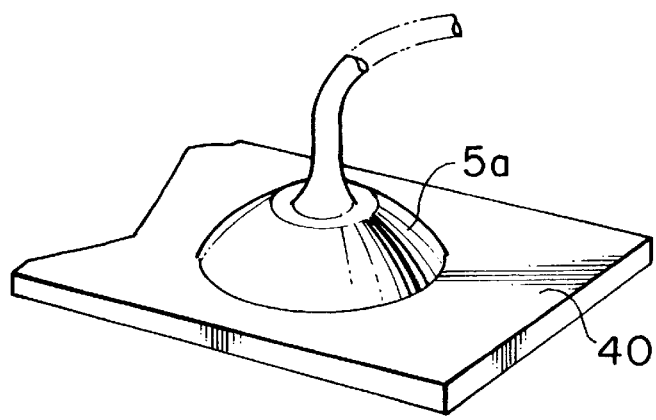
FIG. 6 is a view showing formation of a projective electrode according to an embodiment of the present invention.

As the method for forming the projective electrode 5a having a height of 5 to 20 μm, the following method may be referred. FIG. 6 shows a method for forming the projective electrode by using gold. This is used for gold-made connection between the terminal and the lead of the chip of the semiconductor. By using the so-called wire-bumping method, the electrode 5a is formed on the line 40, and the gold line extended from the electrode 5a is disconnected for forming the projective electrode 5a.

This method offers such an effect as simply implementing the mass production as keeping the height of the projective electrode 5a more accurate. If a silver (Ag) system, copper system or aluminium system may be used as the material, the electrode 5a may be formed. The production is made cheaper according to the describing order, that is, silver, copper, aluminium system metals.

Another method for forming the projective electrode 5a will be described without using the drawings. In the method, a resist is covered on the part except the electrode of the line layer formed on the top of the supporting spring through the insulating film. Then, the plating is applied on the resist cover for forming the projective electrode 5a. By properly changing the thickness and the kind of the resist, the projective electrode 5a is allowed to keep a desired height. This is the same as the formation of the projective electrode in the tape carrier method. This may offer the effect that the mass production is executed as keeping more accurate electrode than the case shown in FIG. 6.

If the height of the projective electrode 5a is equal to or less than the diameter of the root of the projective electrode 5a in the height of the product, the secondary deformation such as buckling is hard to appear from a view of material dynamics. Hence, the adverse effect resulting from the vibration of the slide is allowed to be reduced.

Further, it is possible to form on the projective electrode 5a a film of an alloy of lead and stannum, stannum, indium, bismuth, cadmium, or an alloy of them to have a thickness of 0.5 to 5.0 μm and electrically connect the film to the terminal 2a. In this structure, by electrically connecting the projective electrode 5a to the terminal 2a in the semi-melt or melt state of the heated alloy of lead and stannum, the electric connection is made positively and at low cost.

Moreover, in place of such alloys or metals, a conductive bonding agent may be used for connecting the terminal 2a with the projective electrode 5a. In this case, no melt or semi-melt state appears if the connected part is heated. It is, therefore, unnecessary to consider the secondary deformation caused by the thermal stress. This makes it possible to reduce the adverse effect given to the form in using the supporting spring 3a or the insulating material 41.

For making the electric connection, it is possible to apply the bonding agent between the terminal 2a and the projective electrode 5a, compress the connected part and cure the bonding agent. In this case, the cure shrinkage is brought about so as to cause residual stress of the compression in the connected part. This makes it possible to form a durable conductive part.

[Embodiment 3]

Figure 7A:
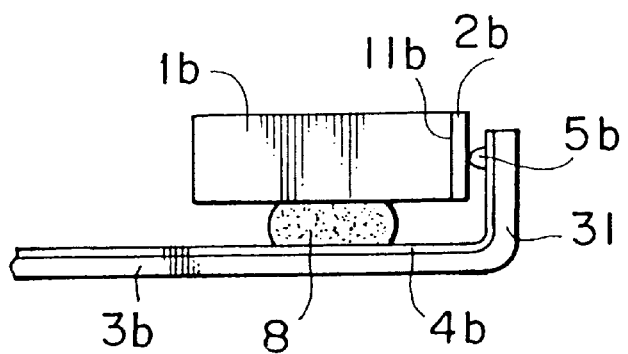
FIGS. 7A and 7B are side views showing a magnetic head assembly according to an embodiment of the present invention.
Figure 7B:
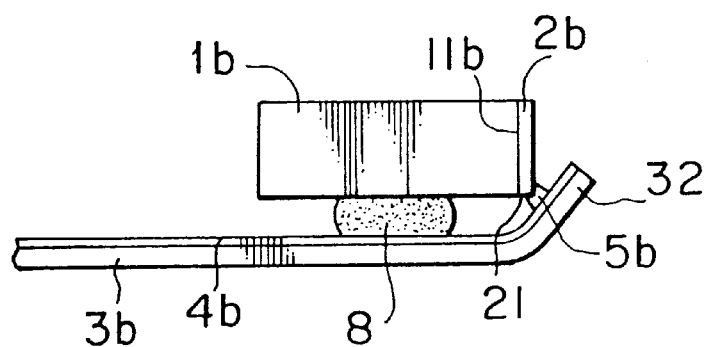

FIGS. 7A and 7B show a third embodiment of the present invention. In particular, FIGS. 7A and 7B show the joint structure between the terminal 2b provided on the side 11b of the magnetic head 1b and the projective electrode 5b formed on the interconnecting line (not shown) within insulating layer 4b on the supporting spring 3b so as to penetrate the insulating layer 4b, the supporting spring 3b being bent to have a segment 31 being in parallel to the side 11b or a segment 32 located to form an acute angle with respect to the side 11b. In the joint structure, the terminal 2b is electrically connected to the projective electrode 5b and the magnetic head 1b is fixed on the supporting spring 3b or the insulating layer 4b formed on the supporting spring 3b with the bonding agent 8, for example.

To discuss the structure in more detail, as shown in FIG. 7A, consider the supporting spring 3b which is bent to have the segment 31 substantially parallel to the side 11b of the magnetic head 1b. The spring 3b includes the projective electrode 5b on the surface 31. This projective electrode 5b may be connected to the terminal 2b provided on the side 11b at substantially right angles. Since the terminal 2b may be sufficiently large, this structure does not need highly accurate positioning of the projective electrode 5b against the terminal 2b.

As shown in FIG. 7B, consider the supporting spring 3b which is bent to have the segment 32 located to form an acute angle with the side 11b of the magnetic head 1b. The projective electrode 5b on the surface 32 is connected to the side 21 of the terminal 2b on the side 11b. In the connection, by raising the projective electrode 5b a bit higher than necessary, easy and accurate positioning between the terminal 2b and the projective electrode 5b is allowed to be achieved as keeping the conductive state excellent.

Further, consider the supporting spring 3b which is bent to have a segment located in parallel to or to form an acute angle with the terminal 2b provided on the side 11b of the magnetic head 1b. If the height of the bent portion is adjusted to be smaller than the total of the height of the magnetic head 1b and the height of the bonding agent 8 used for fixing the magnetic head 1b with the supporting spring 3b, the accuracy of positioning of the magnetic head 1b against the supporting spring 3b does not need to be so high. Hence, this adjusted structure is more advantageous in mass production.

In the aforementioned description, the supporting spring is made of metal. In place of the metal, the supporting spring may be formed of an insulating material such as a resin. In this case, the insulating layer for the line is not required to be formed on the supporting spring. The line may be directly placed on the supporting spring. Hence, this is more advantageous in mass production and offers the effect of reducing the thickness of the mold.

Moreover, in place of the metal, the supporting spring may be formed of a ultraviolet passive type material. In this case, the ultraviolet curing resin used in bonding the supporting spring with the magnetic head is allowed to be cured from the rear side of the magnetic head. Hence, the positioning of the magnetic head against the insulating material or the line on the insulating material is made easier.

[Embodiment 4]

Figure 8:
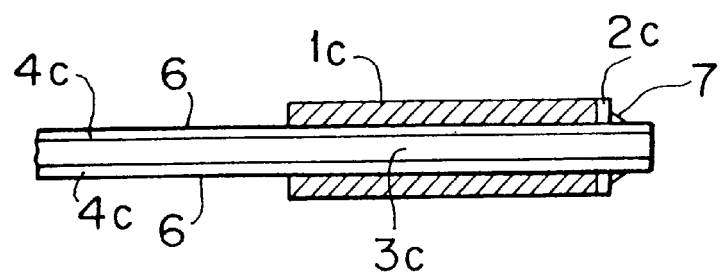
FIG. 8 is a side view showing another magnetic head body according to an embodiment of the present invention.

FIG. 8 shows a fourth embodiment of the present invention. In the fourth embodiment, the terminal 2c provided on the side of the magnetic head 1c is electrically connected to the line 6 provided on the insulating layer 4c formed on the top of the supporting spring 3c without using a lead wire and the magnetic head 1c is fixed with the insulating layer 4c or the line 6 on the top of the supporting spring 3c. Concretely, the conductive bonding agent 7 is used for doing both the electric connection and the fixing. According to this embodiment of the invention, just one fixing is necessary to making the product. This makes the assembling operation more excellent, which is more advantageous in mass production.

If the magnetic disk apparatus is arranged to use a magnetic head assembly having one structure meeting with at least one of the foregoing inventions, the magnetic disk apparatus enables to reduce the weight of the magnetic head assembly itself even if the other components offer the conventional performance. Hence, the magnetic disk apparatus is allowed to be small in size and have a faster data access rate.

[Embodiment 5]

In turn, the description will be oriented to the method for assembling the magnetic head assembly according to an embodiment of the present invention with reference to FIGS. 15A to 15F.

In order to place the magnetic head having a magnetic head element mounted thereon (referred to as a magnetic head 1 as a representative one in the foregoing embodiments) on the supporting spring (referred to as a supporting spring 3 as a representative one in the foregoing embodiments), it is necessary to perform mechanical and electrical connections. In building the magnetic head assembly according to the present embodiment, the magnetic head 1 is fixed to the supporting spring 3 with the bonding agent for securing the mechanical connection. At a time, the bonding is executed for securing the electric connection.

The supporting spring 3 described herein prepares the line on the top thereof. Hence, if only the electric connection for assembling the magnetic head 1 with the supporting spring 3 may give sufficient mechanical strength, no mechanical connecting (fixing) process is required. According to this embodiment, however, the fixing process is executed for enhancing the mechanical strength.

Figure 9:
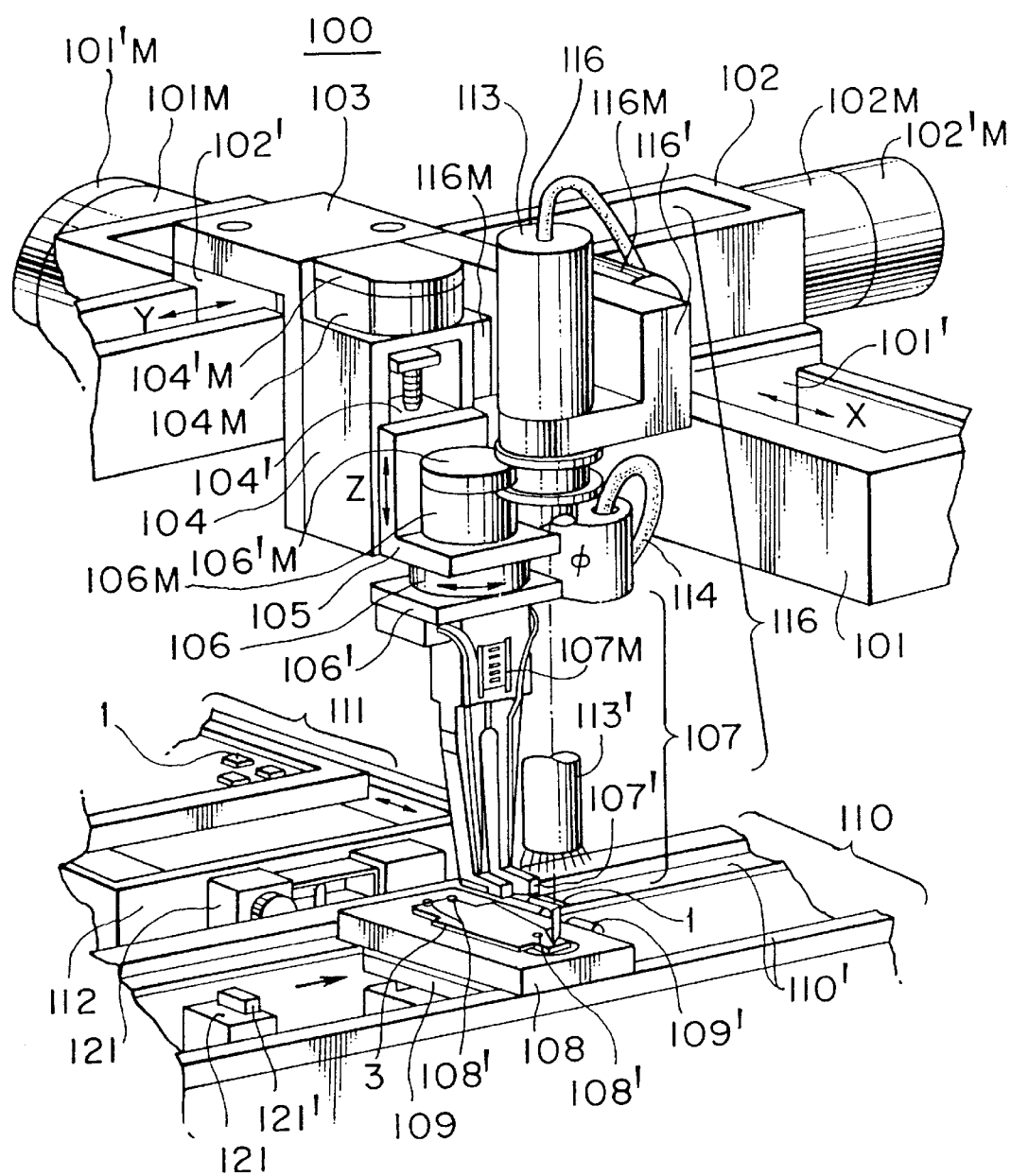
FIG. 9 is a view showing an outer appearance of an apparatus for assembling the magnetic head assembly.
Figure 10A:
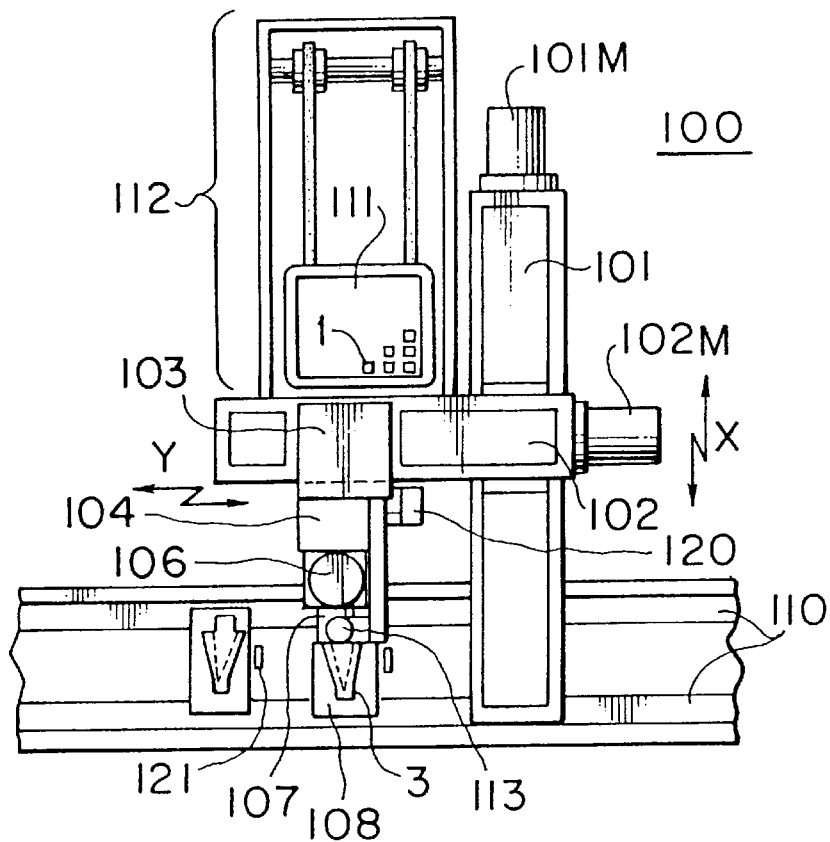
FIG. 10A is a plan view for describing an arrangement of an apparatus for assembling the magnetic head assembly.
Figure 10B:
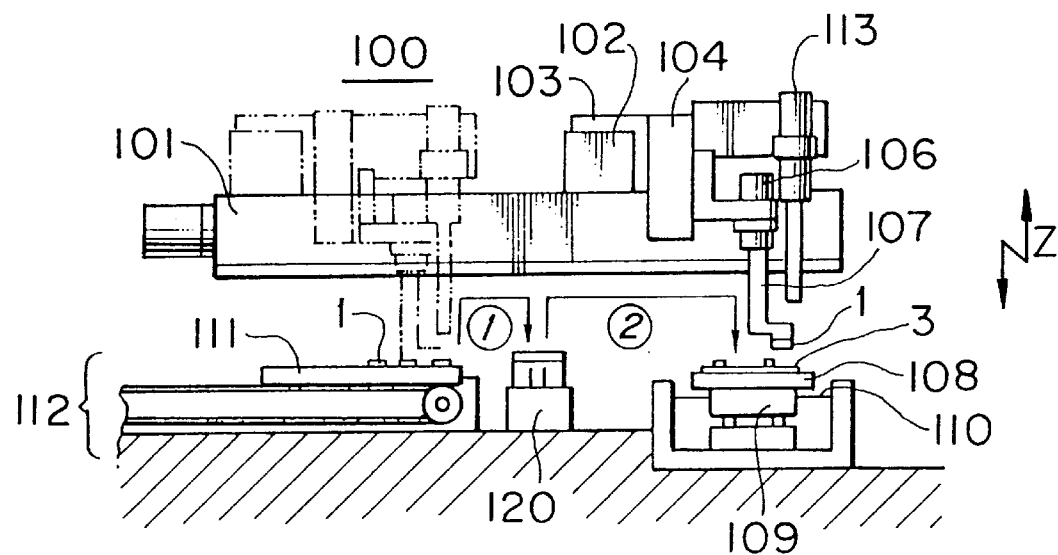
FIG. 10B is a side view for describing an arrangement of an apparatus for assembling the magnetic head assembly.

FIG. 9 is an explanatory view showing an outer appearance of a head fixing machine 100. FIGS. 10A and 10B are explanatory views showing an arrangement of the head fixing machine 100. FIG. 10A is a plan view and FIG. 10B is a side view. As shown, the head fixing machine 100 is arranged to have a parts feeding unit 112, parts conveying unit 110, a driving mechanism (an X-axis driving mechanism 101, a Y-axis driving mechanism 102, a Z-axis driving mechanism 104 and a φ-axis driving mechanism 106) for positioning the magnetic head 1, the driving mechanism enabling to drive along four axes of X, Y, Z and φ independently, a handling mechanism 107 for handling the magnetic head 1, a position adjusting unit 109 for sensing position of the magnetic head 1, adjusting it and serving as a building bench, a measuring unit 116 for measuring a handling state or a fixing state when handling or fixing the magnetic head 1, and a bonding agent coating unit 120 for coating the bonding agent on the magnetic head 1.

The X-axis driving mechanism 101 operates to convert rotation of a motor 101M into a linear motion and move a movable part 101' in the direction of the arrow X.

Like the X-axis driving mechanism 101, the Y-axis driving mechanism 102 operates to convert rotation of a motor 102M into a linear motion and move a movable part 102' in the direction of the arrow Y. The Z-axis driving mechanism 104 operates to convert the rotation of the motor 104M into a linear motion.

The φ-axis driving mechanism 106 operates to directly convey the rotation of the motor 106M to the movable part 106'.

The motors 101M, 102M, 104M and 106M includes encoders 101'M, 102'M, 104'M and 106'M, respectively. The rotational displacements of the motors are directly measured by these encoders provided therewith. With this function, the control unit (not shown) of each axis driving mechanism is operated in a semi-closed manner for the purpose of executing highly accurate positioning.

The Y-axis driving mechanism 102 is connected to the movable part 101' of the X-axis driving mechanism 101. The Z-axis driving mechanism 104 is connected to the movable part 102' of the Y-axis driving mechanism 102 through an L-formed block 103. The φ-axis driving mechanism 106 is connected to the movable part 104' of the Z-axis driving mechanism 104 through an L-formed block 105. Those driving mechanisms are allowed to be driven independently of one another. As such, the final part to be driven by these axis driving mechanisms, that is, the movable part 106' is enabled to synthesize the motions of the axis driving mechanisms for achieving a highly accurate driving operation.

Next, the description will be oriented to the parts conveying unit 110. The parts conveying unit 110 operates to convey a palet 108 on which a part, that is the supporting spring 3, is placed to a predetermined location. The parts conveying unit 110 is composed of a free-flow system belt conveyor 110', the position adjusting unit 109 provided with a flow-stop pin 109', and a flow-stop unit 121.

The supporting spring 3 is conveyed onto the position adjusting unit, that is, the assembling location along the belt conveyor 110'. When it is conveyed, the supporting spring 3 is held on the palet 108 by being tacked by three pins 108'.

The position adjusting unit 109 provides a vertical (Z-axis) driving mechanism in addition to the φX and φY axis posture forming mechanisms. The vertical driving mechanism has a function of switching the height at three stages. At the first stage, the flow-stop pin 109' is located at a middle spot where the flow of the palet 108 is inhibited. At this spot, the position adjusting unit 109 is not in operation until the palet 108 is conveyed up to the flow-stop pin 109'. After making sure that the palet 108 is conveyed up to the predetermined location, the position adjusting unit 109 serves to push the palet 108 up to the upper stage and perform the φX and φY axis position adjustments with respect to the supporting spring 3.

The position adjusting unit 109 takes the steps of measuring the palet 108 or the work piece, that is, the supporting spring 3, at several spots and adjusting the position of the supporting spring 3. When the position adjustment is terminated, the assembly is allowed to be started. While the work is being assembled, the flow-stop unit 121 is driven to keep the flow-stop pin 121' in order not to stop flow of the next palet.

After the assembly of the magnetic head 1 and the supporting spring 3 is terminated, the position adjusting unit is lowered to a low stage (where the flow-stop pin 109' is below the height of the belt conveyor) so that the palet 108 may be placed back onto the belt conveyor. After the assembling operation is terminated, the palet 108 is conveyed to the next stage.

Further, by releasing the flow-stop pin 121' of the flow-stop unit 121, the next palet 108 is sent out to the position adjusting unit 109. The foregoing operation makes it possible to convey the palet 108.

In turn, the parts feeding unit 112 will be described below. The parts feeding unit 112 operates to feed a cartridge 111 up to a predetermined location on a belt which is allowed to travel to and fro. The cartridge 111 holds plural magnetic heads 1 to be assembled.

In the cartridge 111, the magnetic heads 1 are pre-ranged in a matrix of m×n.

To handle the work pieces, that is, the magnetic head 1 in the cartridge 111, it is necessary to accurately measure where the magnetic head 1 is located, because there appears a variation in the feeding accuracy of the cartridge 111 or a variation in the locations of the magnetic heads 1 in the cartridge 111. Further, after the magnetic head 1 is handled, at the assembling time, the highly accurate measuring method is requested to grasp a relative location between the supporting spring 3 and the magnetic head 1 and assemble the magnetic head assembly at so high an accuracy as μm order level.

In this embodiment, therefore, an optical measuring unit 116 is used when assembling the magnetic head 1 and the supporting spring 3.

Next, the arrangement of the measuring unit 116 will be described below. The measuring unit 116 is arranged to have a TV camera 113, an optical system 113' containing a lens and a mirror, an optical fiber 114 for lighting, an auto-focusing driving source 116M, and a movable part 116' for supporting all of them.

The measuring unit 116 operates to measure where the magnetic head 1 or the supporting spring 3 is located if it enters into an eye field of the TV camera 113. Hence, the measuring unit 116 is required to be mounted upwardly of a hand tip 107' for handling the magnetic head 1. The auto-focusing driving source 116M is arranged to vertically drive the movable part 116' like the Z-axis driving mechanism 104. Further, the use of an encoder (not shown) makes it possible to drive quite accurately.

In addition, the optical system 113' provided in this measuring unit 116 is used for the method for mechanically tacking the magnetic head 1.

The present embodiment employs the bonding agent for fixing the magnetic head 1 on the supporting spring 3 as mechanical connecting means. As the bonding agent used for this purpose, the most preferable is a ultraviolet curing resin system bonding agent.

After the measurement and the positioning are terminated, the mechanical connection, that is, fixing is performed by applying the ultraviolet ray. In this case, the UV light source (not shown) is built in a lamp house (not shown) and is switched by a mirror.

The magnetic head body described in this embodiment is traveled through the group of producing apparatuses for executing the mass production. To keep the assembled parts out of slippage, one of the producing apparatuses operates to apply an ultraviolet ray to the assembled product for fixing. In such mass production, however, no time of applying the ultraviolet ray may be given until the sufficient mechanical bonding strength is secured for the product. Hence, the fixing done by applying the ultraviolet ray is temporary fixing. The main fixing is done by anaerobic, heat curing or age-hardening characteristics of the bonding agent.

Figure 11A:
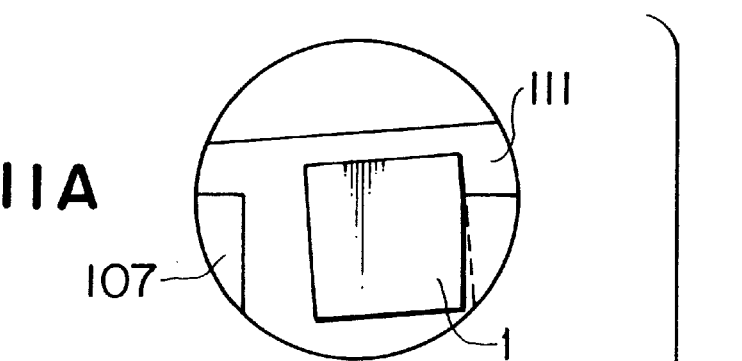
FIGS. 11A to 11D are explanatory views showing how the supporting spring is positioned with respect to the magnetic head provided in a measuring unit.
Figure 11B:
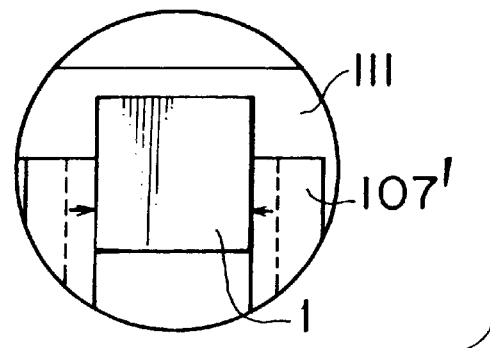

Next, the description will be oriented to the positioning method by using the measuring unit 116 with reference to FIGS. 11A to 11D. The parts of A as shown in FIGS. 11A to 11B indicate the hand tip 107' of the handling mechanism 107 relatively positioned with the magnetic head 1 through the effect of the measuring unit 116 in order to make the handling of the magnetic head 1 out of the cartridge 111 on the parts feeding unit 112 easy. In this case, the relative position of the hand tip 107' against the magnetic head 1 can be recognized from part of the form of the hand tip 107', part of the form of the magnetic head 1 or the contour of the overall image.

Figure 11C:
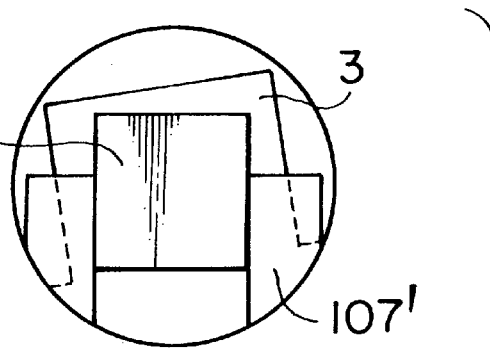
Figure 11D:
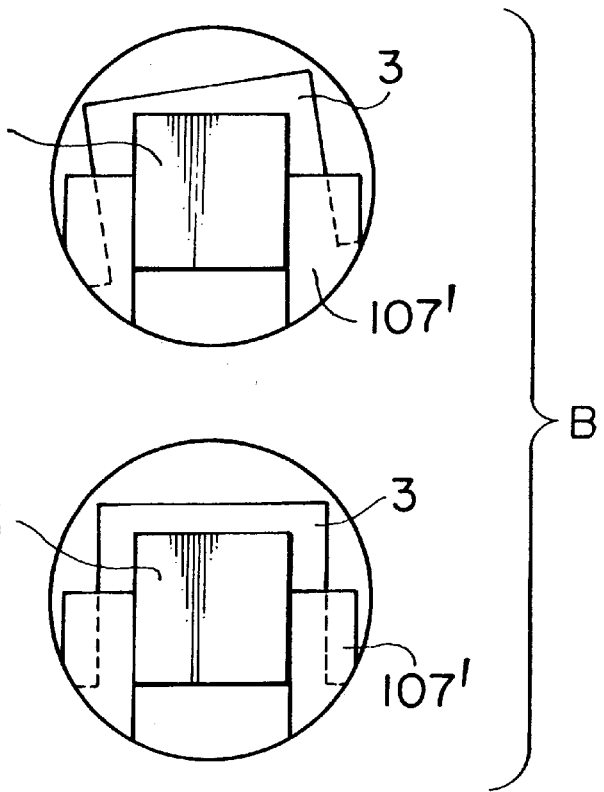

The parts of B as shown in FIGS. 11C to 11D indicate the supporting spring 3 relatively positioned with the magnetic head 1 by using the measuring unit 116 in order to build the supporting spring 3 and the magnetic head 1 in the predetermined places as shown in FIGS. 11C to 11D.

In this case, the relative position between the supporting spring 3 and the magnetic head 1 can be recognized from part of the form of the magnetic head 1 or the contour of the overall image. In the assembly according to this embodiment, however, the outer pattern of the supporting spring 3 is used as a positioning mark as shown in FIGS. 11C to 11D. Based on the pattern, the relative positioning is executed. In place of the outer pattern of the supporting spring, the interconnecting pattern (line) on the spring (not shown) may be used as the positioning mark for offering the same effect.

The relative positioning based on the above mark does not need to add the positioning mark. This makes it possible to reduce the magnetic head assembly in size and eliminate the marking steps.

Next, the bonding agent is coated on the opposite side to the recording medium side of the magnetic head 1. Then, the magnetic head 1 is positioned up to the predetermined place and is pressed for fixing. Next, the ultraviolet ray is applied for curing the bonding agent. This is the termination of fixing of the magnetic head 1 to the supporting spring 3.

Figure 12A:
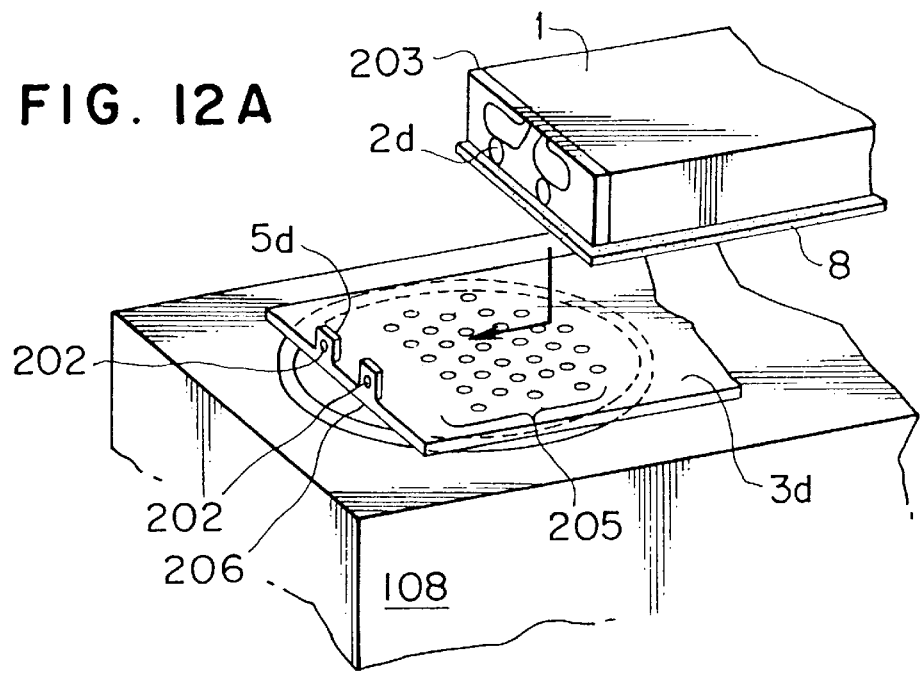
FIGS. 12A to 12C are explanatory views showing assembling of the magnetic head with the supporting spring having netted holes.
Figure 12B:
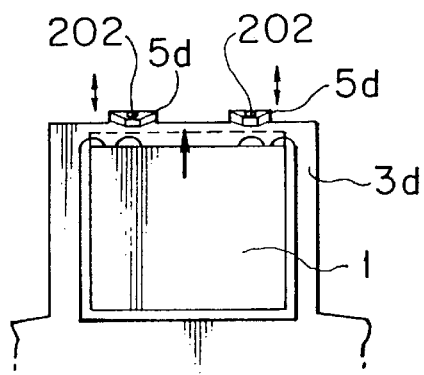

Next, the description will be oriented to the electric connecting method with reference to FIGS. 12A to 12C to 15A to 15G. In the electric connecting method, as shown in FIGS. 12A and 12B, the bonding-agent-coated terminal 2d of the magnetic head 1 being held by the hand tip 107' (not shown) is pressed on plural projective terminals 5d provided on the supporting spring 3d (in the direction of the arrow in FIG. 12A) for keeping the electric conduction through the contact therebetween. In this state, the magnetic head 1 is positioned against the supporting spring 3 and then both are fixed by applying the ultraviolet ray. (Further, in FIG. 12A, netted holes 205 are formed at the tip portion of the supporting spring 3d. Hence, through these holes, the ultraviolet ray is applied from the lower surface 206.)

In this electric connection, the projective terminal 5d is elastic. (The projective terminal 5d is movable in the direction of the arrows as viewed in the plan views of FIGS. 12B and 12C.) Hence, the electric connection with the magnetic head 1 can be secured independently of the vibration occurring when the product is used. The electric connection provides a truss-structured contact. Unlike the conventional rigid-frame contact, therefore, no bending moment is applied to the contact. This is effective in reducing the displacement like a position angle of the magnetic head 1 being in use. At the time, since no heat is required when electrically connected, this electric connection is also effective in lessening the adverse effect applied to the other components rather than the other electric connection.

Moreover, according to this embodiment, the line (pattern) on the magnetic head 1 or the terminal 2 of the electric connection is located on one side. The conventional thin-film forming process may be used for manufacturing the products even if the layout of the pattern used in the conventional product or the terminal 2 is a bit changed. That is, the use of the conventional facility and process makes it possible to restrict the investment in research, plant and equipment.

Figure 13:
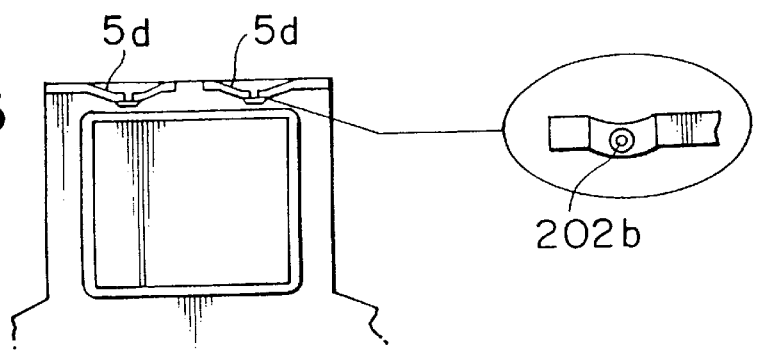
FIG. 13 is an explanatory view showing the structure in which a solder pad is provided on a projective terminal.

In addition, if more electric contact resistance or mechanical contact resistance when the product is used takes place, it is possible to employ the method of taking the steps of forming a pad 202b on the projective terminal 5d provided with holes, press the magnetic head 1 against the pad 202b for fixing both with each other, and then soldering the fixed portion, as shown in FIG. 13. Many soldering methods may be selected. According to this embodiment, a ray of high energy density is applied for melting the solder.

Figure 12C:
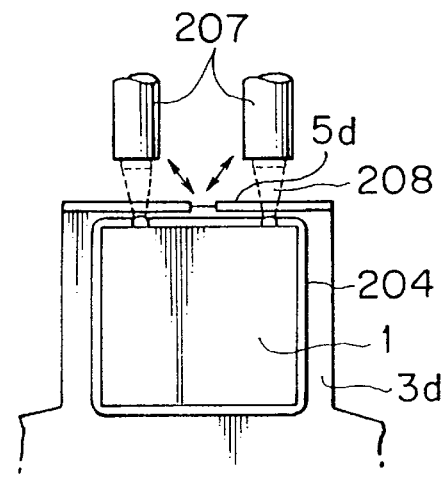

FIG. 12C shows the application of a ray 208 of high energy by an optical fiber 207. As shown in FIG. 12C, by changing the form of the projective terminal 5d, the displacement of the terminal 5d may be increased.

Figure 14A:
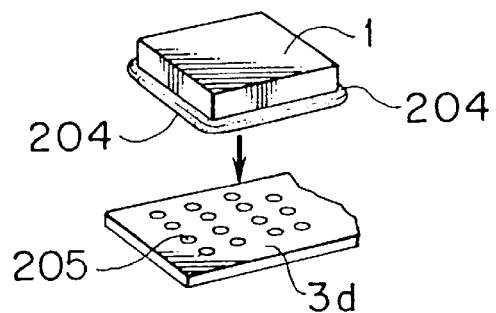
FIGS. 14A to 14D are explanatory views showing an effect of the supporting spring provided with netted holes.
Figure 14B:
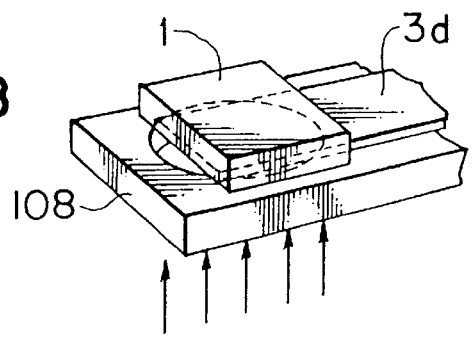

In turn, the description will be oriented to the effect of the netted holes shown in FIG. 12A with reference to FIGS. 14A to 14D. As shown in FIG. 14A, if the magnetic head 1 is fixed on the supporting spring 3d, the temporary fixing is done by only cure of the protrude of the bonding agent, because this method has just one way of applying the ultraviolet ray from the top for fixing. This kind of temporary fixing does not provide sufficient mechanical strength. To strengthen the fixing, it is possible to form the netted holes 205 on the supporting spring 3d and apply a ultraviolet ray from the lower side of the palet 108 for curing the bonding agent in the netted holes as shown in FIG. 14B. This results in being able to secure stronger mechanical connecting strength.

As a specific effect of this embodiment, the warpage caused by curing the bonding agent between the magnetic head 1 and the supporting spring 3 is allowed to be lessened. The warpage will be described below.

Figure 14C:
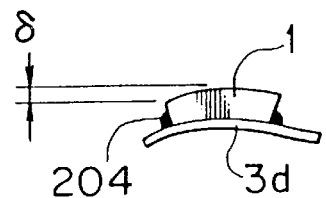

The necessary bonding of the magnetic head 1 with the supporting spring 3d is not satisfied with the mechanical strength given by the protrude 204 of the bonding agent only from that side. Hence, the amount of protrude of the bonding agent is required to be large. In this case, however, if only the protrude 204 of the bonding agent is cured, the warp as shown in FIG. 14C is brought about. The warpage 6 is made larger as the protrude 204 of the bonding agent becomes larger.

Figure 14D:
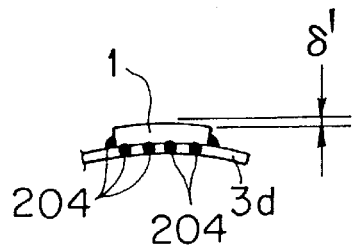

As such, it is better to reduce the protrude 204 of the bonding agent as much as possible. The reduction, however, does not provide sufficient mechanical strength. To cope with this problem, the protrudes 204 of the bonding agent are formed in the netted holes 205 as shown in FIG. 14D and are cured. This makes it possible to reduce the warpage into δ' (δ>δ'). If the supporting spring 3d is larger than the magnetic head 1, the ultraviolet ray is applied from the lower surface of the spring 3d for mechanically fixing both of them. This is also another effect. Hence, the netted holes formed on the supporting spring are made greatly effective.

Figure 15A:
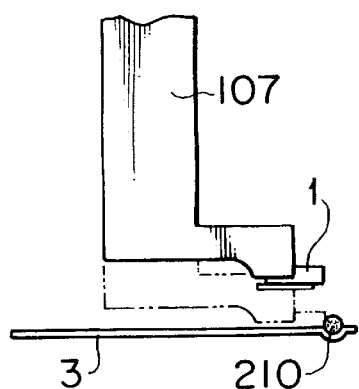
FIGS. 15A to 15F are explanatory views showing a bonding operation to be done by a ray of high density energy.
Figure 15B:
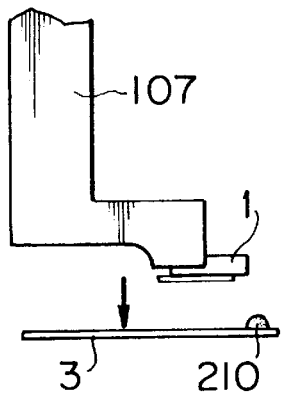
Figure 15C:
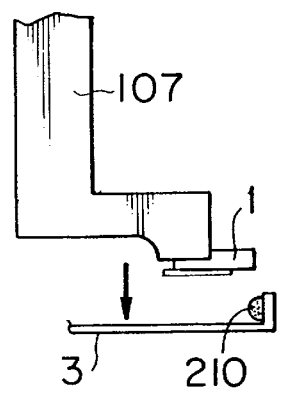
Figure 15D:
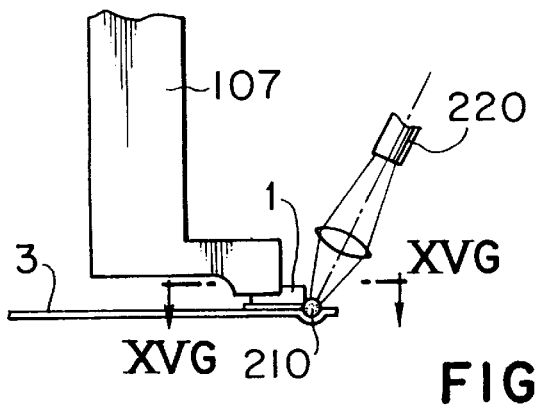
Figure 15E:
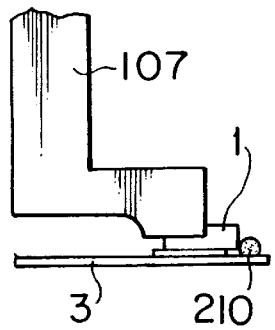
Figure 15F:
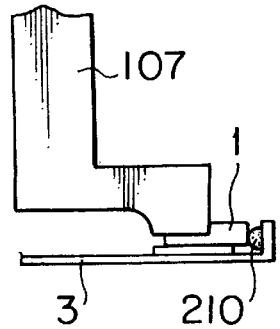
Figure 15G:
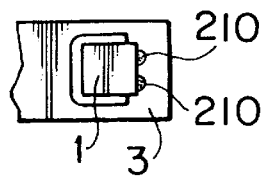
FIG. 15G is a plan view showing the part cut on the line XVG—XVG of FIG. 15D.
Figure 16:
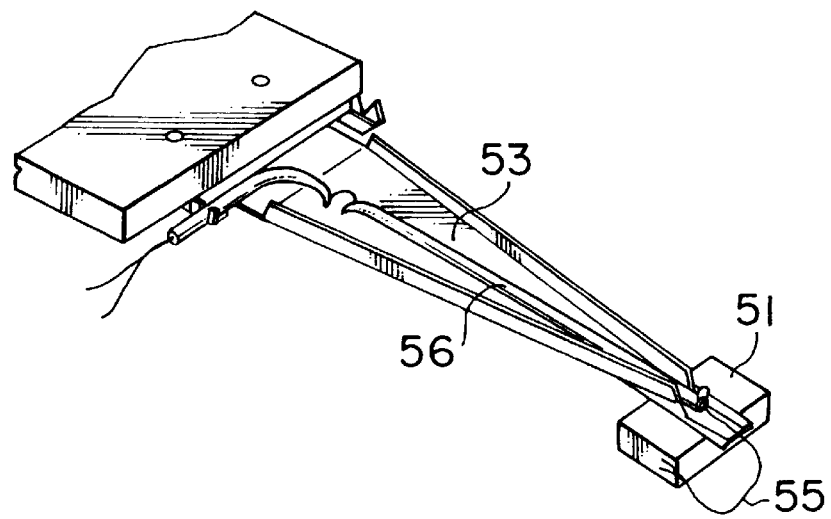
FIG. 16 is a view showing an outer appearance of the conventional magnetic head assembly.
Figure 17:
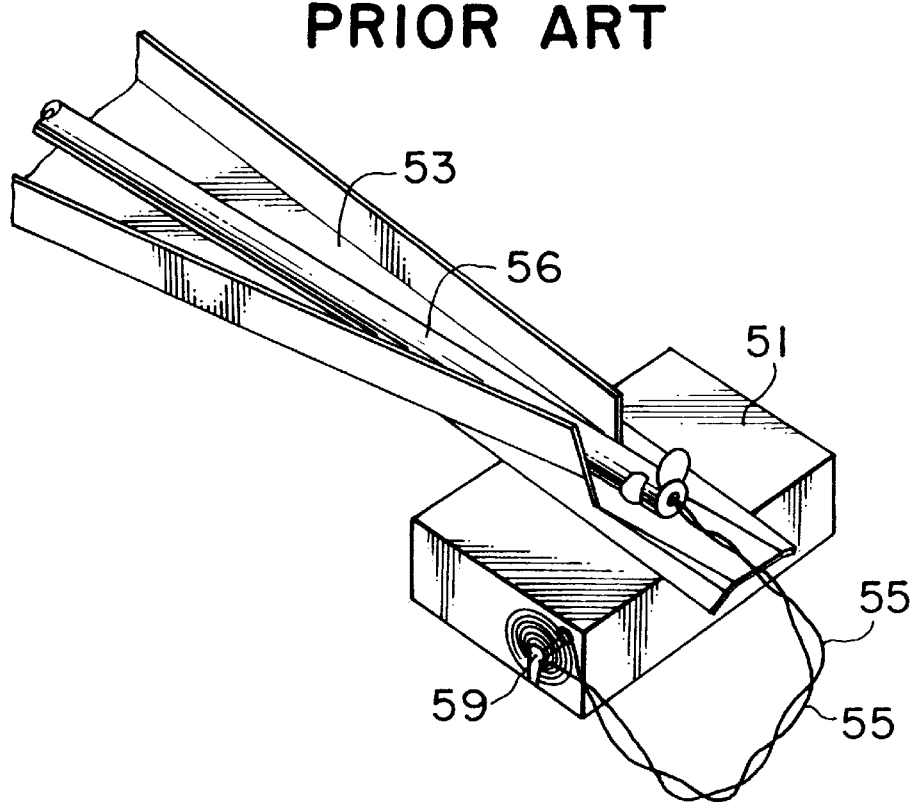
FIG. 17 is an expanded view showing a part around the magnetic head included in the conventional magnetic head assembly.
Figure 18A:
FIGS. 18A to 18H are explanatory views showing a process for producing the supporting spring.
Figure 18B:
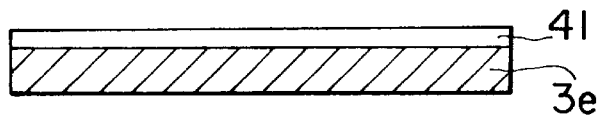
Figure 18C:
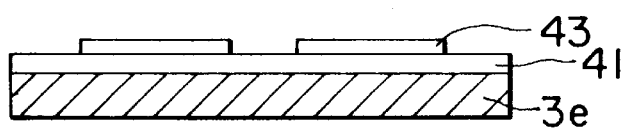
Figure 18D:
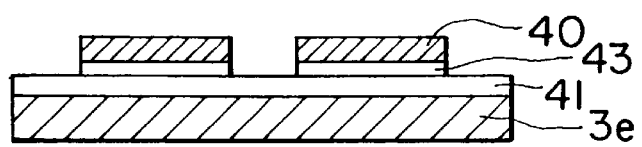
Figure 18E:
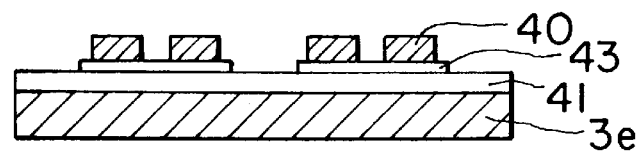
Figure 18F:
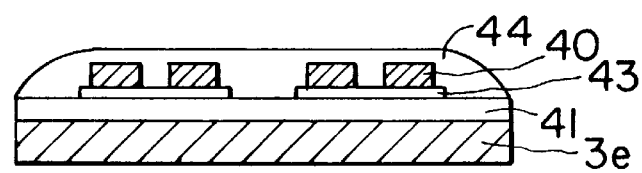
Figure 18G:
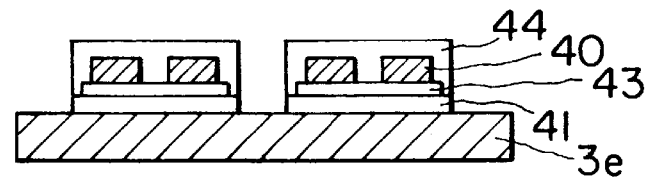
Figure 18H:
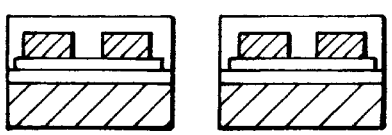
Figure 19A:
FIGS. 19A to 19H are explanatory views showing a process for producing the supporting spring.
Figure 19B:
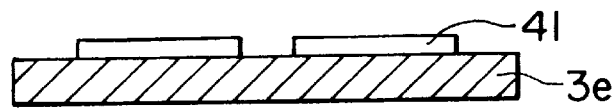
Figure 19C:
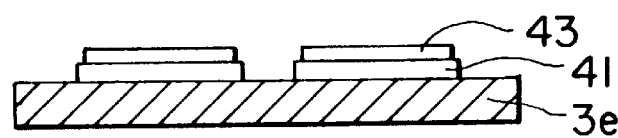
Figure 19D:
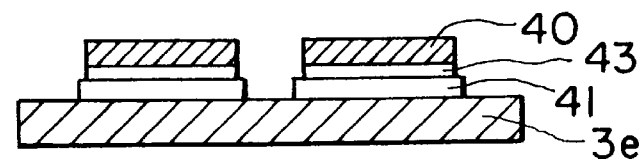
Figure 19E:
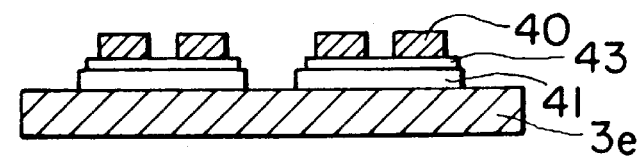
Figure 19F:
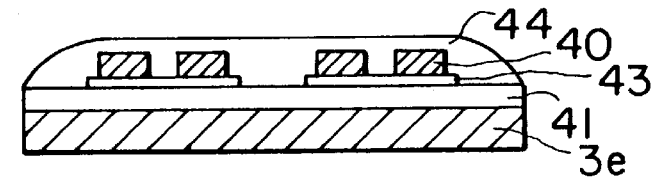
Figure 19G:
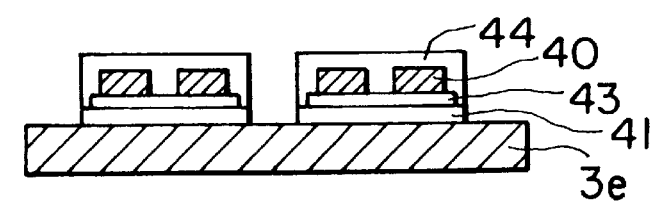
Figure 19H:
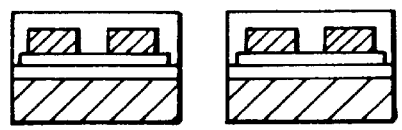

FIGS. 15A to 15G show an embodiment in which the electric connection is executed by the bonding based on the ray of high energy (laser beam in this embodiment). The structures shown in FIGS. 15A to 15G are just those varied in the location and the form of the solder. Hence, the description will be representatively oriented to the structures as shown in FIGS. 15A, 15D and 15G.

As shown in FIG. 15A, after the magnetic head 1 is handled by the handling mechanism 107, as shown in FIGS. 15D and 15G, the magnetic head 1 is positioned and fixed on the supporting spring 3d. Then, the laser beam is applied to the connecting portion for doing the laser bonding.

In this case, a solder portion 210 is prepared on the supporting spring 3. The solder portion 210 is melted by applying a laser spot from the optical fiber 220 for connecting the supporting spring 3 with the terminal of the magnetic head 1. At this time, as shown in FIG. 15A, it is better to form a small concave area on the supporting spring 3, so that the solder may be flown into the rear surface of the magnetic head 1. This is effective in enhancing the reliability of the electric connection.

Further, if a laser spot is allowed to be applied, the solder portion may be melted even in the supporting spring structures as shown in FIGS. 12A to 12C, 13 and 14A to 14D. (In addition, as shown in FIG. 12C, the laser spot may be applied from the side.)

[Embodiment 6]

Herein, the method for producing the supporting spring will be discussed in more detail. FIGS. 18A to 18H show the method for producing the supporting spring. The description will be expanded with reference to these figures.

[Step 1]

After cleaning the surface of a sheet-like substrate (supporting spring) 3e made of stainless, a drop of polyimide resin is dropped to the surface for insulating the substrate. The polyimide resin is spin-coated in order to have an insulating film 41 of about 2 μm. This is advantageous in making the insulating film 41 thinner and lessening the adverse effect given to the stiffness of the supporting spring. Another material except the polyimide resin may be used as the insulating film 41 if it may have an insulating characteristic. To form the insulating film 41, it is possible to thermally press the filmy sheet with the bonding agent against the substrate 3e. For example, the resulting sheet is composed of polyimide of 20 μm and epoxy bonding agent of 25 μm. This sheet is advantageous in mass production. The adverse effect on the stiffness of the supporting spring can be solved by the half-etching technique to be discussed below.

Nickel is sputtered on the substrate having the insulating film 41 formed thereon. The coat of Nickel is as thick as 0.5 μm. This is a ground film 43 used for plating at the time of forming the line at the next step. Any material may be used if it is conductive. Herein, the suitable material is chrome or nickel, because such a material has difficulty in diffusion into the insulating film composed of polyimide.

Next, copper is plated to have a coat of 30 μm for forming the line 40 on the ground film 43. Any material for the line may be used if it is conductive and can be plated. Herein, by considering the electric resistance, copper is used. After being plated, the plated coat is patterned by a line-formed resist mask and then is etched for forming the line 40.

Then, a protective film 44 is formed by spin-coating the material or pressing (or bonding) the sheet on the line-formed substrate like the foregoing insulating film 41. Next, the resist mask formed like the supporting spring is placed on the protective film 44 for patterning. With the patterned polyimide, that is, the insulating film and the protective film as a mask, the supporting spring 3 is formed by means of the dry etching.

The method for making the above step more accurate is shown in FIG. 19 and then will be described below.

[Step 2]

After cleaning the surface of the sheet-like substrate (supporting spring) 3e made of stainless, a drop of polyimide resin is applied on the substrate and spin-coated on it in a manner to have an insulating film 41 of about 2 μm. A desired formed mask is applied onto the insulating film 41. The mask is formed to cover the supporting spring. Then, the mask is removed by the etching. As the material of the insulating film 41, any material except the polyimide resin may be used if it provides an insulating characteristic. To form the insulating film 41, it is possible to thermally press a filmy sheet with the bonding agent onto the cleaned surface of the substrate 3e.

On the substrate on which the insulating film 41 is formed, there is sputtered nickel. The coat of nickel is as thick as 0.5 μm. This is the ground film 43 for plating when forming the line at the next step. Any material is used for the ground film 43 if it is conductive. Herein, the suitable material is chrome or nickel, because such a material is hard to diffuse into the polyimide composing the insulating film. The ground film 43 is formed to cover the line 40 and the insulating film 41.

Next, copper is plated on the ground film 40 for forming the line 43. As the line material, any may be used if it is conductive and to be plated. Herein, copper is used by considering the electric resistance. After copper is plated, the plated copper film is patterned by using the line-formed mask and then is etched for forming the line 40. Then, a protective film 44 is formed by spin-coating the material or pressing (or bonding) the sheet on the line-formed substrate like the foregoing insulating film 41. Next, the resist mask formed to cover the supporting spring is placed on the protective film 45 for patterning. Again, the mask formed like the supporting spring is applied on the patterned protective film 44 for patterning. The resulting substrate is treated by the wet etching for forming the supporting spring 3. As a feature of this step, the leased resist mask is used for etching the portion formed like the supporting spring without using the insulating film 41 and the protective film 44 as masks. The final form like the supporting spring can be worked more accurately.

Both at the above steps 1 and 2, the lines of the supporting spring are formed at a time when forming the supporting spring. This method is, therefore, advantageous in removing the line-forming steps and enabling the small magnetic head to be connected to the spring, thereby reducing the apparatus in size. Further, on the surface opposite to the pattern (line) side on the supporting spring, the half-etching is executed so as to control a variety of stiffness in the line 40, the insulating film 41 and the protective film 44. As a result, the uniform product is provided.

Figure 20A:
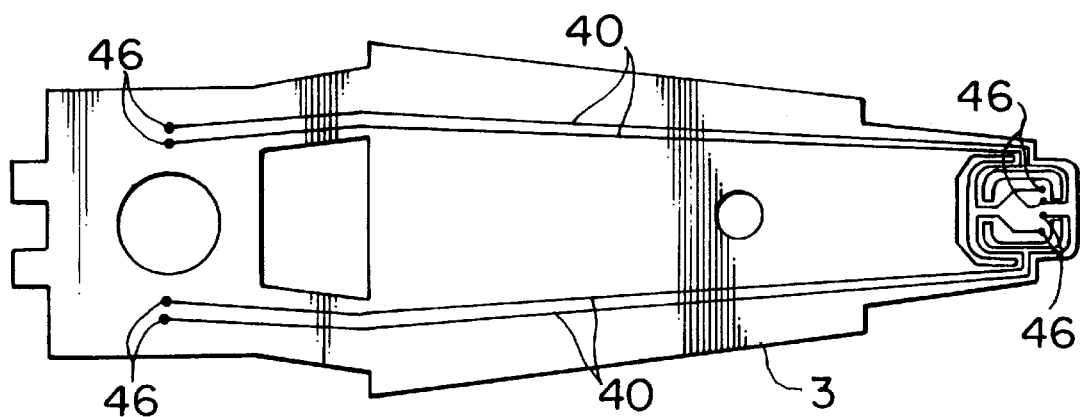
FIGS. 20A and 20B are explanatory views showing interconnecting lines and line terminals located on the top of the supporting spring.
Figure 20B:
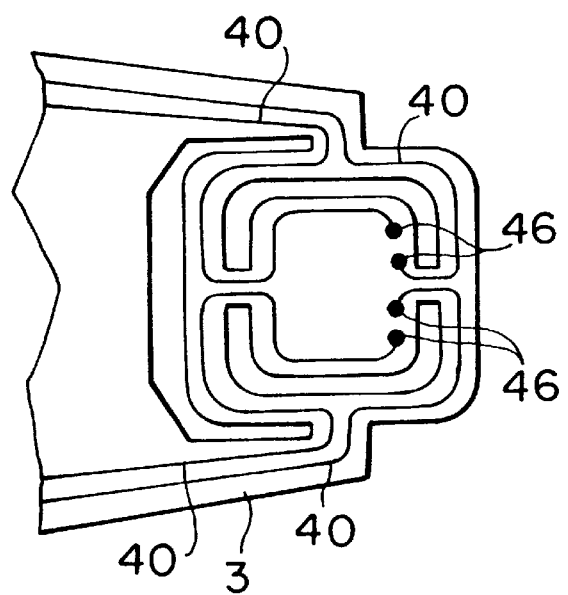

As shown in FIGS. 20A and 20B, in the formation of the lines at the above steps 1 and 2, the circular line end 46 is formed to have a larger diameter than the width of the line. This makes it easy to connect the magnetic head to the supporting spring. Herein, the excellent connection is implemented by setting a line width size as 50 μm and a diameter of the line end as 100 μm.

By mounting the magnetic head body provided with the supporting spring, the spacing of the disk served as a recording medium of the magnetic disk apparatus may be set as 1.0 to 2.0 mm. At a time, the surface recording density of the magnetic disk apparatus may be set as 600 to 1000 Mb/in 2.

As described above, the magnetic head is electrically connected to the line formed on the supporting spring through the projective electrode or the projective terminal. This connection makes it possible to reduce a relative locational displacement of the magnetic disk against the magnetic head assembly, which disadvantageous displacement has been conventionally brought about by the lead wire. The reduction of the displacement results in enhancing the efficiency and the reliability of I/O between the magnetic head element and the magnetic disk.

Further, the supporting spring provided with netted holes allows the ultraviolet ray to be applied from the rear side of the head-mounted side of the supporting spring to the head-mounted surface. Further, those holes serve as relief places when curing the bonding agent. Hence, the supporting spring is effective in alleviating the tension resulting from the cured bonding agent, thereby reducing the warpage of the magnetic head or the supporting spring, which warpage corresponds to the total distortion of the cured bonding agent.

Moreover, the magnetic disk apparatus having the magnetic head assembly according to the present invention offers the effect of speeding up the operation of magnetically recording and reading data, because the magnetic head assembly is allowed to be reduced in size.

What is claimed is:

1. A magnetic head assembly comprising:
   a slider having a magnetic head element with a connecting terminal formed thereon;
   a supporting spring having a projective electrode thereon; and
   an electrically non-conductive bonding material bonding said slider on said supporting spring so that said connecting terminal of said magnetic head element directly contacts said projective electrode and establishes an electrical connection therebetween;
   whereby said projective electrode and said connecting terminal form a continuous electrical solderless junction.

2. A magnetic head assembly according to claim 1, wherein said connecting terminal is formed of an expandable metal.

3. A magnetic head assembly according to claim 2, wherein said connecting terminal is formed of gold.

4. A magnetic head assembly according to claim 1, wherein said projective electrode is formed of one of gold, lead, stannum, indium, bismuth, cadmium, silver, copper, aluminum, and an alloy of these metals.

5. A magnetic head assembly according to claim 1, wherein said bonding material is provided in a spacing between said slider and said supporting spring.

6. A magnetic head assembly according to claim 5, further comprising a conductive bonding agent bonding said connecting terminal and said projective electrode.

7. A magnetic head assembly, comprising:
   a magnetic head slider, said magnetic head slider having a vertical side with a magnetic head element and a connecting terminal formed vertically thereon;
   a supporting spring having an electrode thereon; and
   a bonding material bonding said magnetic head slider on said supporting spring so that said connecting terminal of said magnetic head element directly electrically contacts said electrode;
   whereby said electrode and said connecting terminal form a continuous electrical solderless junction.

8. A magnetic head assembly as claimed in claim 7, wherein said electrode is squeezed between a lower edge of said magnetic head slider and said supporting spring.

9. A magnetic head assembly as claimed in claim 7, wherein a portion of said supporting spring having said electrode thereon is bent toward said magnetic head slider to place said electrode into contact with said connecting terminal.

10. A magnetic head assembly as claimed in claim 9, wherein said connecting terminal extends to a lower edge of said magnetic head slider, and said portion of said supporting spring is bent at a slant to the remainder of said supporting spring to place said electrode into contact with said connecting terminal at said lower edge of said magnetic head slider.

11. A magnetic head assembly as claimed in claim 9, wherein said portion of said supporting spring is bent at substantially a right angle to the remainder of said supporting spring to place said electrode into contact with said connecting terminal on said vertical side of said magnetic head slider.

12. A magnetic head assembly as claimed in claim 7, wherein said electrode comprises a portion of said supporting spring that has been extruded to form the electrode.

13. A magnetic head assembly as claimed in claim 7, wherein said connecting terminal of said magnetic head slider extends to a lower edge of said magnetic head slider.

14. A magnetic head assembly as claimed in claim 7, wherein said electrode is formed of an expandable metal.

15. A magnetic head assembly as claimed in claim 14, wherein said electrode is formed of a metal selected from the group consisting of gold, lead, stannum, indium, bismuth, cadmium, silver, copper, aluminum, and an alloy of one of those metals.

* * * * *